R. MAEDA & T. MIMBU.
CYCLE SUPPORTING ATTACHMENT.
APPLICATION FILED MAY 5, 1915.
1,187,917.
Patented June 20, 1916.
2 SHEETS—SHEET 1.
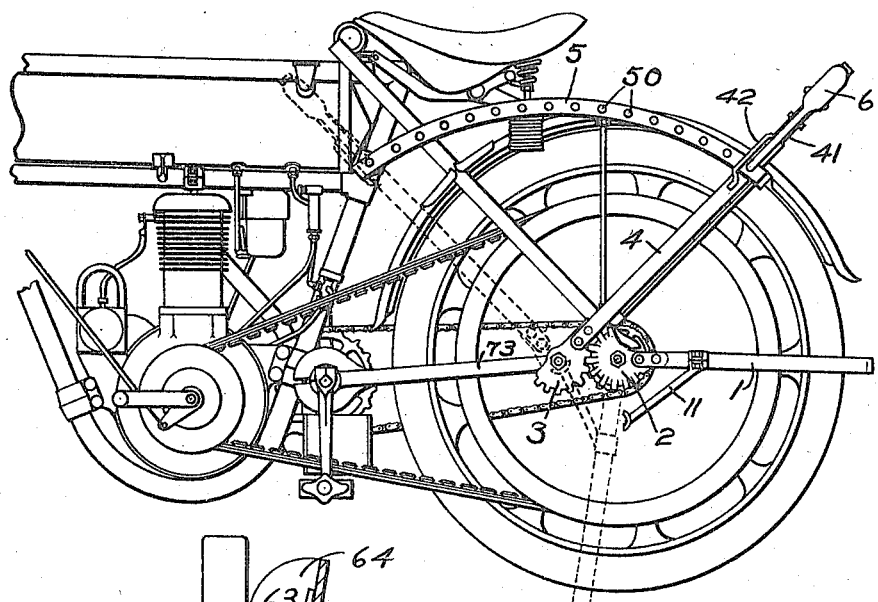
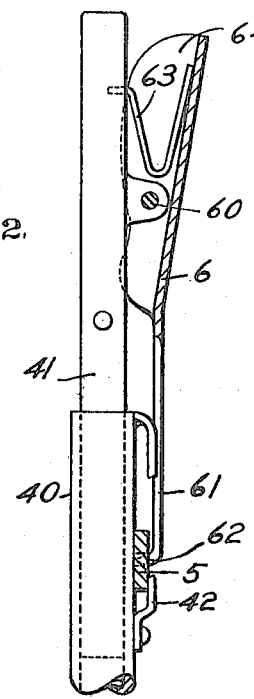
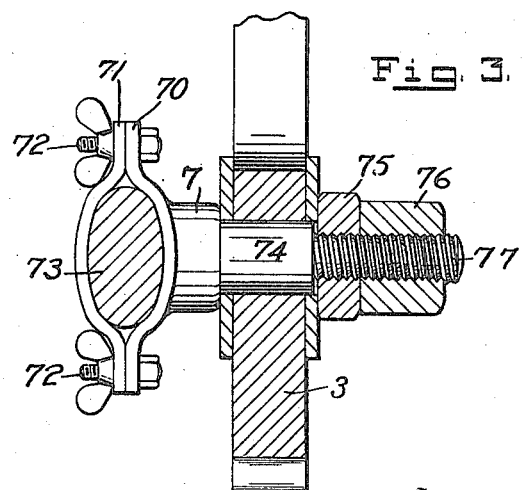
Witnesses
Charles L. Reynolds.
Eugene C. Searle
Inventors
Rinsai Maeda
Teruzo Mimbu
By Adams & Reynolds.
Attorneys

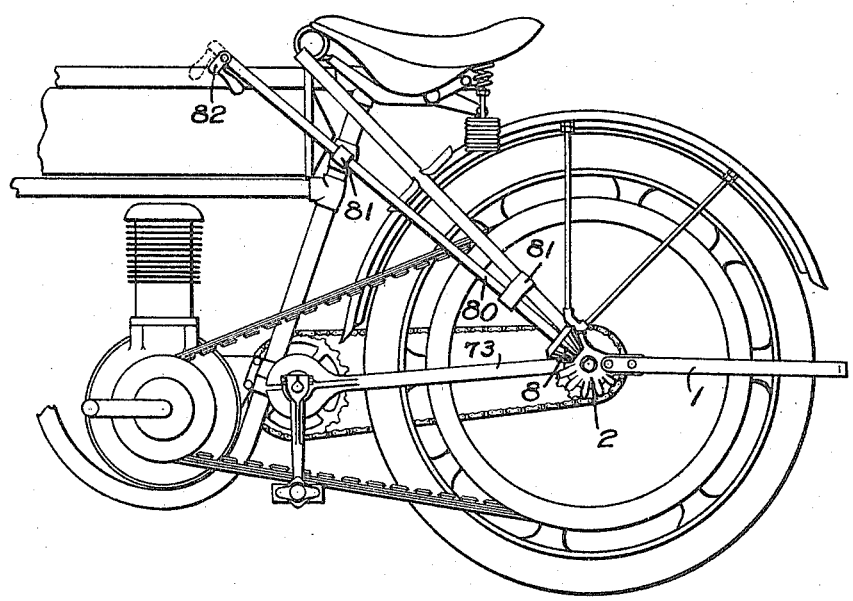
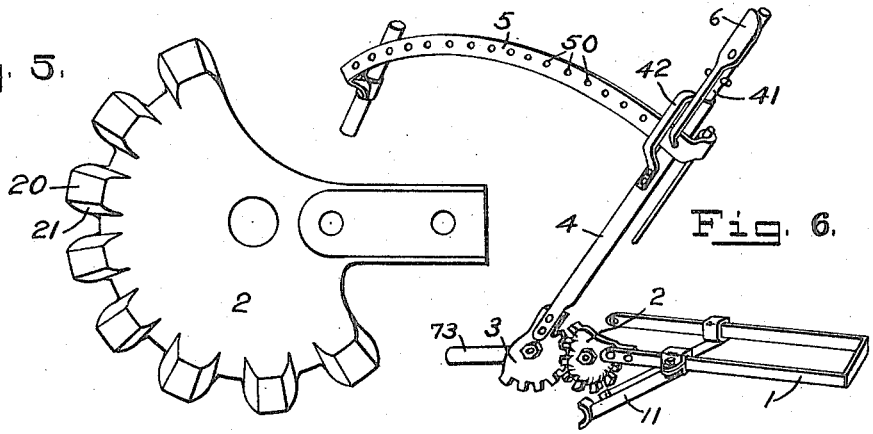

UNITED STATES PATENT OFFICE.

RINSAI MAEDA AND TERUZO MIMBU, OF SEATTLE, WASHINGTON.

CYCLE-SUPPORTING ATTACHMENT.

1,187,917.  Specification of Letters Patent.  Patented June 20, 1916.

Application filed May 5, 1915. Serial No. 25,887.

*To all whom it may concern:*

Be it known that we, RINSAI MAEDA and TERUZO MIMBU, subjects of the Emperor of Japan, and residents of Seattle, in the county of King and State of Washington, have invented certain new and useful Improvements in Cycle-Supporting Attachments, of which the following is a specification.

Our invention relates to improvements in devices for supporting cycles and consists of certain novel features which will be hereinafter described and particularly pointed out in the claims.

The object of our invention is to produce a cycle supporting mechanism which may be quickly and easily raised and lowered, and which may be positively held at any desired angle, the whole to be of simple and effective construction.

In the accompanying drawings we have shown our invention in the forms which are now preferred by us.

Figure 1 is a side view of the rear portion of a motor cycle having our invention thereon. Fig. 2 is a detail showing the operating handle and the means for securing it in adjusted position. Fig. 3 shows the main pivot and the manner of attaching the device to the cycle frame. Fig. 4 is a side elevation of a motor cycle showing a slightly modified construction of our device. Fig. 5 is a side view of the segment gear employed in our device. Fig. 6 is a perspective view of our device detached from the motor cycle.

The cycle supporting member employed consists of legs 1 pivoted to the axle of the rear wheel and connected by a bar lying outside the periphery of the wheel, this being held in elevated position when not in use and swung downward beneath the wheel so as to support the rear end of the cycle off the ground. This is the type of supporting member commonly employed. The pivoted end of these supporting members is provided, at one side of the cycle, with a segment gear 2, this gear preferably being so formed as to have teeth upon its periphery and also upon its side, being thus both a spur gear and a bevel gear.

The operating lever 4 is secured to a segment gear 3 which is pivotally mounted upon the cycle frame forward of the axle of the rear wheel, in such position as to mesh with the segment gear 2.

The operating lever 4 is telescopic, consisting of tube 40 which is fixedly secured to the segment gear 3, and a bar 41 which is mounted to reciprocate within the tube 40. In the raised position of the supporting legs 1, the operating lever is thrown to the rear as is shown by full lines in Fig. 1. The position of the legs and the operating lever when the device is used for supporting the cycle, is shown by dotted lines in Fig. 1.

A sector bar 5 which is curved to lie adjacent the rear wheel guard, is secured by its forward end to the frame under the saddle and by its rear end in the same manner as is the wheel guard. While this bar is curved its center of curvature does not coincide with the pivot center of the operating lever. The radius of curvature of this bar is greater than it would be if its center were at the pivot center of the operating lever. Upon the outer end of the pivoted section 40 of the operating lever, is segment retaining bar 42 which is secured by its ends to the section 40 of the operating lever and has its main body offset therefrom forming a face within which the sector bar 5 lies.

The sector bar 5 is provided with a series of holes or indentations 50, designed for the reception of a point carried by a locking member. This locking member consists of a lever 6 pivoted at 60 upon the outer section 41 of the operating lever and having an end 61 extending toward the pivot end and terminating in an offset point 62 which is designed for entering the holes 50. The upper end 64 of this lever lies alongside of and is adapted for engagement by the hand to lift the point 62 out of the hole 50 in which it may be placed. A spring 63 serves to normally hold the point 62 in engaging position. The retaining bar 42 is of sufficient length to compensate for the eccentric curvature of the segment bar 5. The telescopic character of the outer section 41 of the operating lever, permits its reciprocation so as to accommodate the clamping device to the position of the bar 5.

The preferred manner of securing the pivot axis of the operating lever to the frame is shown in Fig. 3. One end of the stud 7 has a transverse bar 70 secured thereto, which coöperates with a bar 71 to embrace a bar 73 of the cycle frame, the two bars 70 and 71 being secured by bolts 72. The stud 7 has a reduced section 74 upon which the segment gear is mounted and a further reduced section 77, which is threaded and receives the lock nuts 75 and 76.

Fig. 4 shows a construction which is slightly modified. In this case a bevel pinion 8 is mounted upon a shaft 80 which is supported in bearings 81 on the cycle frame and extends upwardly and forwardly, terminating below and in front of the saddle. A bell crank lever 82 is pivoted upon this upper end and may be used for turning the shaft 80 and the rotation of the bevel pinion 8.

The supporting legs 1 preferably are provided with one or more brace bars 11 which are positioned so as to engage their outer ends with the frame or a member fixed thereon. As herein shown this bar is designed for engagement with the pivot axis of the operating lever or with the nuts carried by the outer end thereof.

Having now described our invention, what we claim and desire to secure by Letters Patent of the United States is:

1. A lever securing means comprising in combination with a pivoted lever, a sector bar of curvature eccentric to the pivot of said lever, a telescopic extension freely sliding in the upper part of said lever, and means attached to said extension and engaging said sector bar for securing the lever in adjusted position.

2. A cycle supporting attachment comprising a movable leg, a lever pivoted to the cycle frame and adapted to move said leg into and out of operative position, a fixed sector bar of curvature eccentric to the pivot of said lever, a telescopic extension sliding in the upper end of said lever, a bar secured to said lever and embracing said sector bar, and permitting relative radial and circumferential movement between said bar and lever, and means attached to said extension and engaging the sector bar for securing the lever in adjusted position.

Signed at Seattle, Washington, this 27th day of April, 1915.

RINSAI MAEDA.
TERUZO MIMBU.

Copies of this patent may be obtained for five cents each, by addressing the "Commissioner of Patents, Washington, D. C."